(12) United States Patent
Newton (10) Patent No.: US 6,546,245 B1
(45) Date of Patent: Apr. 8, 2003

(54) INVERTED CODE SEQUENCE CORDLESS SIGNALING

(75) Inventor: Kenneth A. Newton, Kutztown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/413,203

(22) Filed: Oct. 5, 1999

(51) Int. Cl.$^7$ .................................................. H04Q 7/20
(52) U.S. Cl. ......................... 455/426; 375/142; 375/150
(58) Field of Search ............................... 455/462, 463, 455/464, 426; 370/335, 342, 441, 522, 527, 529; 375/340, 341, 343, 142, 150

(56) References Cited

U.S. PATENT DOCUMENTS

| | | | | |
|---|---|---|---|---|
| 3,806,663 A | * | 4/1974 | Peek et al. .................. 455/572 |
| 4,460,992 A | * | 7/1984 | Gutleber ...................... 370/441 |
| 4,979,205 A | * | 12/1990 | Haraguchi et al. .......... 455/411 |
| 5,144,639 A | * | 9/1992 | Uchida et al. ............... 375/142 |
| 5,212,715 A | * | 5/1993 | Pickert et al. ............... 375/114 |
| 5,297,203 A | * | 3/1994 | Rose et al. .................. 380/270 |
| 5,319,634 A | * | 6/1994 | Bartholomew et al. ..... 370/441 |
| 5,321,739 A | * | 6/1994 | Higashiyama ............... 455/412 |
| 5,398,258 A | * | 3/1995 | Su et al. ...................... 375/200 |
| 5,610,939 A | * | 3/1997 | Takahashi et al. .......... 375/206 |
| 5,615,227 A | * | 3/1997 | Schumacher, Jr. et al. .. 375/206 |
| 5,892,793 A | * | 4/1999 | Gibson ........................ 375/208 |
| 6,263,009 B1 | * | 7/2001 | Ramberg et al. ............ 375/130 |
| 6,289,209 B1 | * | 9/2001 | Wood, Jr. ................. 455/277.1 |

* cited by examiner

Primary Examiner—Dwayne Bost
Assistant Examiner—Joy K. Contee
(74) Attorney, Agent, or Firm—William H. Bollman (57) ABSTRACT

A method and apparatus to perform a signaling protocol between a base station and a remote handset of a digital cordless telephone to simplify the digital cordless telephone. A pseudo-noise (PN) code correlation detector of a direct sequence spread spectrum (DS/SS) module, included in a base station and a remote handset, detects an inverted correlation state in a received digital signal when an strong inverted direct current (DC) content is sensed in the received digital signal. This is indicative that an inverted code sequence was sent in the received digital signal. By pulse-keying the inverted correlation state, commands may be encoded to implement a simplified cordless signaling protocol. For the base station, the two commands encoded are a 'Flash' and a 'On-hook/Off-hook' toggle. For the remote handset, the two command encoded are a 'Ring' and a 'Page/Find'.

19 Claims, 9 Drawing Sheets

FIG. 1

DIGITAL SPREAD SPECTRUM CORDLESS TELEPHONE 100

BASE STATION

HANDSET

INVERTED CODE SEQUENCE CORDLESS SIGNALING

BACKGROUND OF THE INVENTION

1. Field of the Invention

This invention relates to digital cordless telephones, and more particularly to a digital cordless telephone that implements an inverted code sequence cordless signaling.

2. Background of Related Art

Cordless telephones are popular consumer devices that allow a user in a home or office the freedom to stray hundreds of feet from a base station. The typical cordless telephone includes a base station that is physically connected to the user's telephone company lines and a handheld handset unit. The physical hard wire connection between a corded handset and a conventional telephone set is replaced by a radio frequency (RF) link.

Initially, the remote handsets of cordless telephones communicated with their base station using analog signals. In more recent years, advancements have been made with respect to cordless telephones allowing digital communications between the remote handset and its base station. The entry of cordless telephones into digital communications generally provides better voice quality because of increased noise rejection, and a somewhat higher range. However, the increased voice quality and higher range involves using many more components and an increasing complexity in the digital cordless telephones. Consequently, the increased components and increased complexity may result in a higher cost for the digital cordless telephone for the average consumer.

Figure 6A:
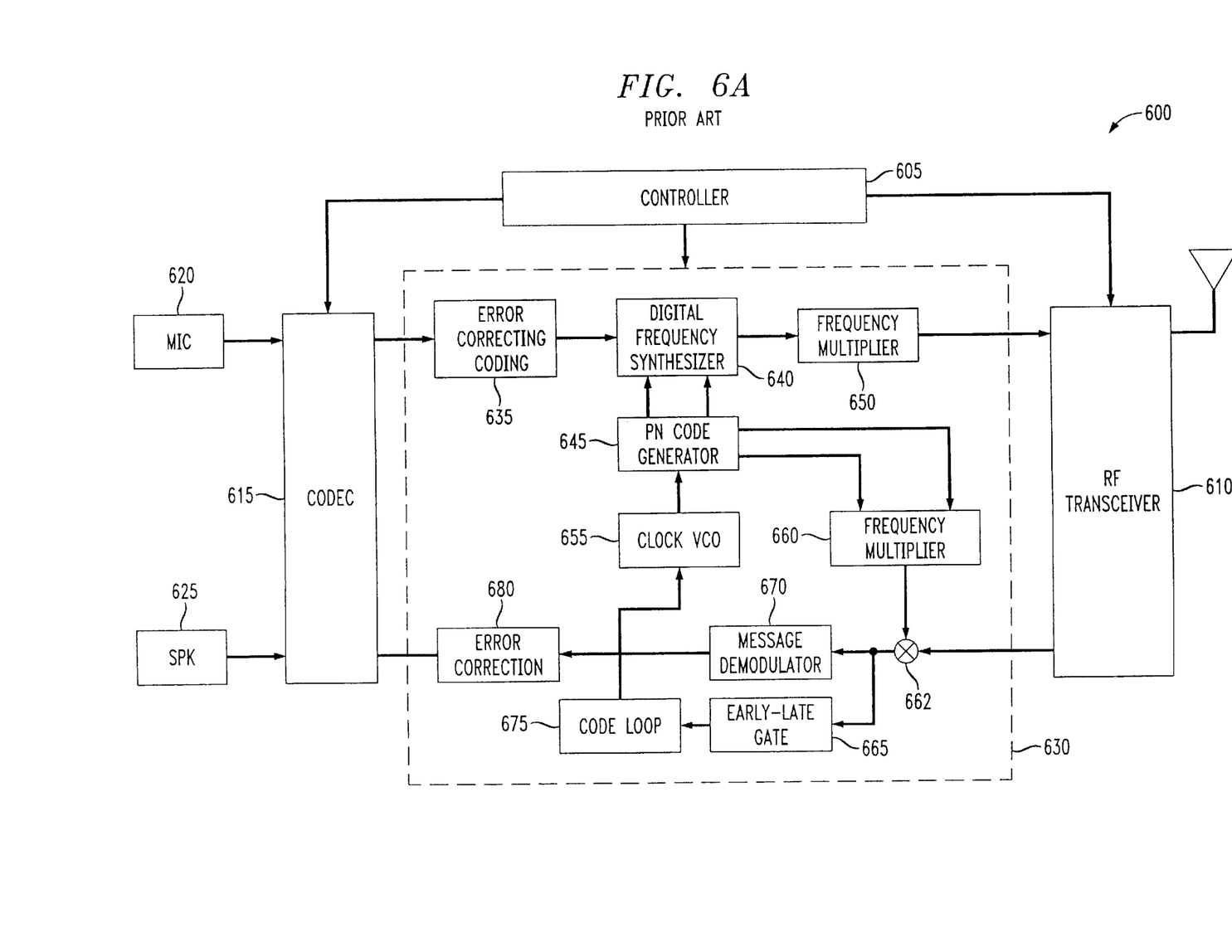
FIG. 6 shows a block diagram of a conventional spread spectrum digital cordless telephone.

FIG. 6A shows relevant features of a conventional frequency hopping digital remote handset 600 of a digital cordless telephone. In FIG. 6A, the remote handset 600 includes a controller 605, a radio frequency (RF) transceiver 610, a coder-decoder (CODEC) 615, a microphone 620, a speaker 625 and a spread spectrum module 630.

The controller 605 may be a digital signal processor (DSP), microprocessor, or microcontroller. The controller 605 provides an execution platform for a software program that operates the remote handset 600.

The RF transceiver 610 provides a RF interface between the remote handset 600 and a base station. The remote handset 610 relays voice signals between a base station via RF link. The RF transceiver 610 provides a conversion between RF signals and the digitized voice signals.

The CODEC 615 provides a way to convert between the analog voice signals and the digital voice signals. The CODEC 615 is typically an electronic device that converts analog voice signals to digital voice signals via an analog-to-digital converter (not shown). Also, the CODEC 615 converts received digital voice signals to analog voice signals via a digital-to-analog converter (not shown).

The microphone 620 provides a way for the user to input voice signals into the remote handset 600.

The speaker 625 provides a way for the user to hear the output voice signals from the remote handset 600.

The spread spectrum module 630 provides a way for the remote handset 600 to convert between digital voice signals into a spread spectrum digital voice signal.

The spread spectrum module 630 includes an error-correcting module 635, a digital frequency synthesizer 640, a transmitting frequency multiplier 650, a pseudo-noise (PN) code generator 645, a clock 655, a receiving frequency multiplier 660, a mixer 662, a message demodulator 670, a early-late gate module 665, a code loop module 675, and an error correction module 680.

In the transmit direction, a microphone 620 outputs an analog signal to the CODEC 615 which converts the microphone input signal to a digital microphone signal. The digital microphone signal is inputted to the spread spectrum module 630 for encoding into a spread spectrum digital signal.

The digital microphone signal is initially passed to the error correcting module 635 of the spread spectrum module 630 to provide a way to reconstruct the digital microphone signal if there are any errors during transmission to a base station.

After the error-correcting module 635, the digital microphone signal is passed to the digital frequency synthesizer 640. The digital frequency synthesizer 640 provides a way to produce another frequency from a reference signal based on an input control word. In this particular embodiment, the input control word may be m bits long. In the input control word, one of the m bits is part of the digital microphone signal and the PN generator 645 supplies the rest of the (m−1) bits. The PN generator 645 supplies the (m−1) bits in a PN sequence, which is passed to the digital frequency synthesizer 640. The digital frequency synthesizer 640 then generates a new signal in one of the M frequencies, where $M=2^m$. Thus, the digital microphone signal is mapped into one of $M=2^m$ frequencies.

The mapped digital microphone signal is then passed to the transmitting frequency multiplier 650. The transmitting frequency multiplier 650 processes the mapped digital microphone signal into yet another frequency. The frequency multiplication is used to increase the processing gain and bandwidth of the mapped digital microphone signal. The output of the transmitting frequency multiplier 650 is then a spread spectrum digital signal ready for transmission.

Figure 6B:
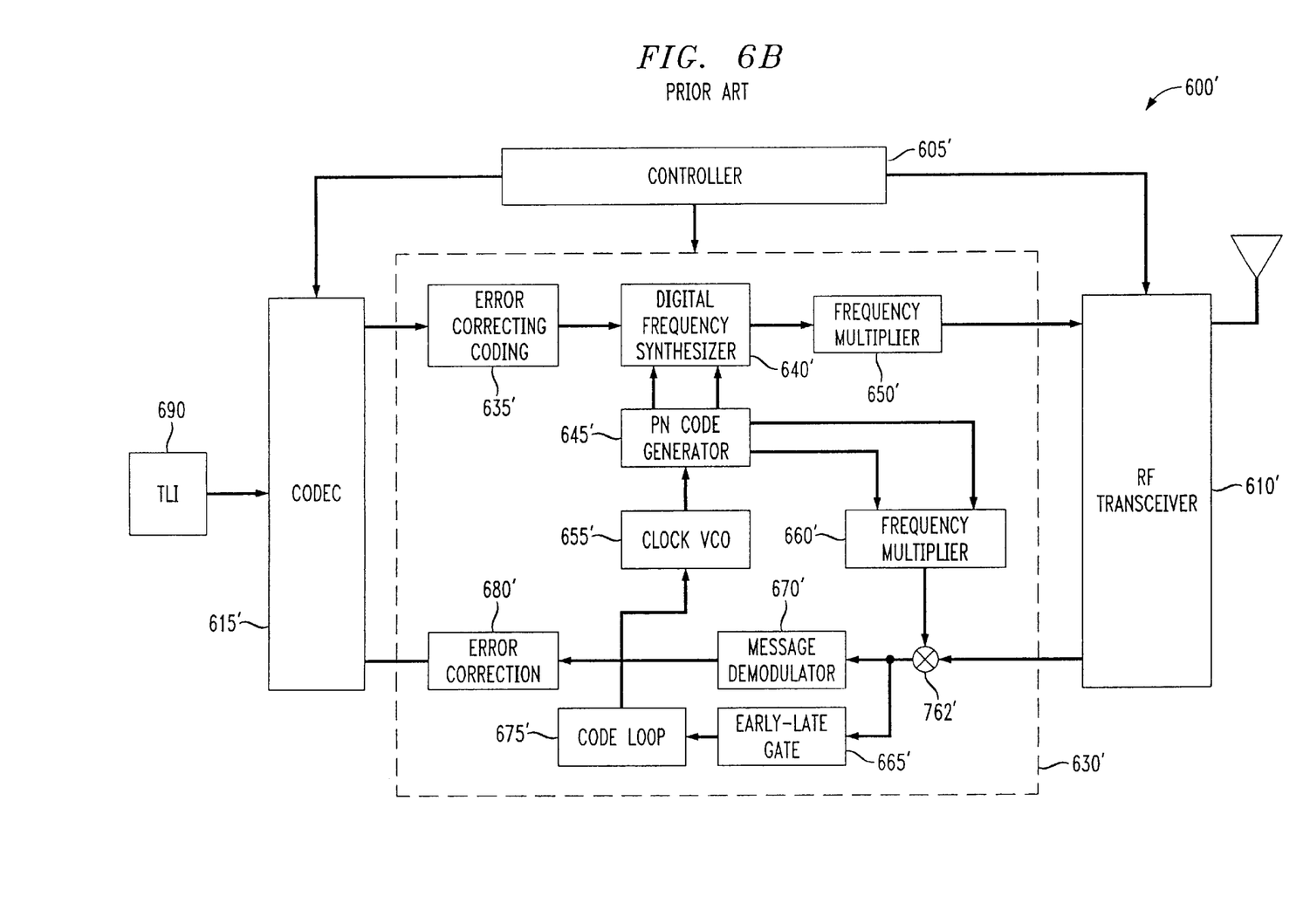

The spread spectrum digital signal is transmitted by a RF transceiver 610 to a complementary base station 600' shown in FIG. 6B.

Referring back to FIG. 6A, in the receive direction, the RF transceiver 610 receives a RF digital spread spectrum signal from the complementary base station 600'. The RF transceiver 610 translates the RF digital spread spectrum signal to a digital spread spectrum signal. The RF transceiver 610 then passes the spread spectrum digital signal to the spread spectrum module 630 for further processing.

The digital spread spectrum signal is multiplied by an identical signal from the PN generator 645 used during the transmission of the digital spread spectrum signal at the mixer 662. The PN generator 645 supplies (m−1) bits in a PN sequence to the receiving frequency multiplier 660. The receiving frequency multiplier 660 generates the identical signal used during the transmission of the digital spread spectrum signal which is then sent to the mixer 662 to be processed with the incoming digital spread spectrum signal.

The resulting digital signal from the mixer 662 is a binary frequency shift keyed (FSK) signal. The message demodulator 670 demodulates the resulting digital signal. The message demodulator 670 is typically an FSK-type demodulator.

The demodulated digital signal is then passed to the error correction module 680 to recover the original digital signal. The timing synchronization in the receive path is controlled by the early-late gates 665 which controls the clock frequency.

The decoded digital signal is driven to the CODEC 615 as input. The CODEC 615 converts the digital signal to an analog signal to drive the speaker 625.

The base station 600', shown in FIG. 6B, contains circuitry which is complementary to that contained in the remote handset 100, i.e., a complementary RF transceiver 610', a controller 605', a CODEC 615', and a spread spectrum module 630'. The base station 600' also includes a telephone line interface 690 to interface with a public switched telephone network.

Although digital spread spectrum cordless telephones operate adequately; a limiting factor in their popularity is their cost. In implementing spread spectrum techniques, there may be a larger number of components used in the digital cordless telephones. With the increased the number of components, there is a corresponding increase in the cost of the telephone.

Another cost factor, which may push the price of the digital spread spectrum cordless telephone, is the implementation of a cordless signaling protocol. The cordless signaling protocol is used to implement typical commands such as 'Talk', 'Ring', 'Flash', and etc. The command generation and processing may introduce additional hardware into the digital spread spectrum cordless telephone.

Figure 7:
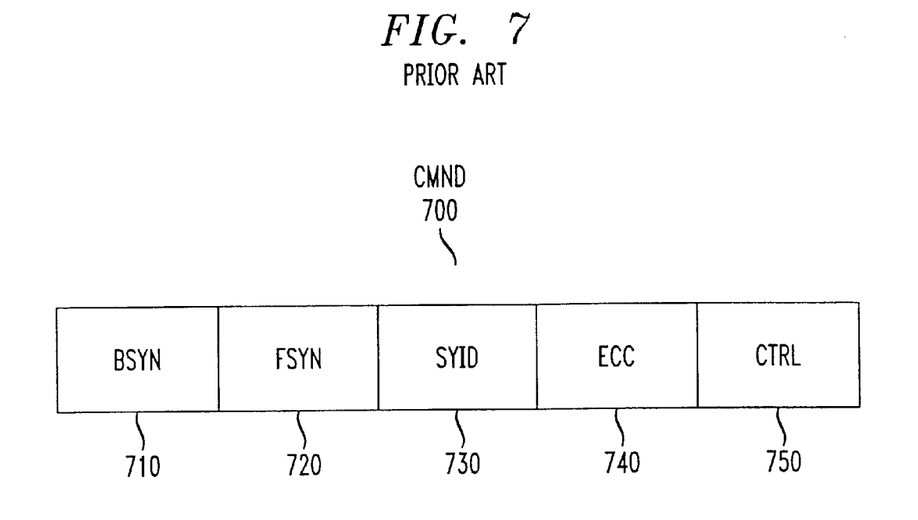
FIG. 7 illustrates a block diagram of a command packet used for signaling in a conventional spread spectrum digital cordless telephone.

FIG. 7 illustrates a conventional command code 700 used in a conventional signaling protocol between the handset 600 and base station 600'. As shown in FIG. 7, the conventional command code 700 may be in a packet format. The command code includes bit synchronizing (BSYN) bits 710, frame synchronizing (FYSN) bits 720, system identifying (SYID) bits 730, error correcting code (ECC) bits 740, and control (CTRL) bits 750.

The BSYN bits 710 provide a bit level synchronizing between the handset 600 and base station 600'.

The FSYN bits 720 provide a command frame level synchronizing between the handset 600 and base station 600'.

The SYID bits 730 provide a way for the handset and base station to identify each other. Typically, the handset 600 and base station 600' are a paired set. In the event that there are other digital cordless telephones in the area, the SYID 730 provide that commands sent between a paired set of the handset and base station are processed the paired set.

The ECC bits 740 provide a way to correct for errors in the command code between the handset 600 and the base station 600'.

The CTRL bits 750 provide a way to indicate which function or command to implement.

When the handset 600 or base station 600' receives a command code 700, the controller, 605 or 605', respectively, synchronizes the incoming code on a bit and frame level by using the BSYN bit 710 and FSYN bits 720. The receiving controller, 605 or 605', decodes the received SYID bits 730 match the receiving SYID. If there is no match, the command code 700 is discarded. Otherwise, the command code 700 is checked for errors by processing the ECC bits 740, and the CTRL bits 750 are executed.

In order to implement the conventional signaling protocol, additional hardware, such as microcontrollers, microprocessors, memory, registers, and etc., are included in the digital spread spectrum cordless telephone. The inclusion of additional hardware may increase the costs of the digital spread spectrum cordless telephone. Thus, implementing a cordless signaling protocol between remote handset and base station may also increase the cost of the digital spread spectrum cordless telephone.

There is a need for a digital cordless telephone that offers the benefits of spread spectrum technology at a reduced cost.

SUMMARY OF THE INVENTION

In accordance with the principles of the present invention, a method for cordless signaling in a digital cordless telephone is disclosed. The method comprises transmitting a signal from a transmitter of the digital cordless telephone, inducing a signaling state from the signal in a receiver of the digital cordless telephone, and decoding a command from the signal.

A system for cordless signaling in a digital cordless telephone is disclosed. The system comprises a transmitter, a receiver, and a receiving detector; and a receiving controller. The receiving controller, receiving a signal transmitted from the transmitter, decodes a command from a signaling state induced by the signal in the receiving detector located in the receiver.

Another aspect of the present invention, a receiver for cordless signaling from a transmitter in a digital cordless telephone is disclosed. The receiver comprises a code detector, a receiving radio frequency (RF) transceiver, and a receiving controller. The receiving controller, upon receiving a signal from the RF transceiver, decoding a command from the transmitter if the code detector detects a signaling state from the signal.

Another aspect of the present invention, a transmitter for cordless signaling to a receiver in a digital cordless telephone is disclosed. The transmitter comprises a transmitting signal converter, a spreader; and a transmitting controller. The transmitting controller generates a command by pulsing an output of the transmitting signal converter to an input of the spreader.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides, in a direct sequence based spread spectrum cordless telephony, a simple command signaling using an inverted code sequence between a base station and a remote handset.

In particular, the present invention provides for an inverted code sequence to invoke an inverse correlation state to signal commands between a base station and a remote handset of a digital cordless telephone. A pseudo-noise (PN) code correlation detector of a direct sequence spread spectrum (DS/SS) module, included in the base station and the remote handset, detects an inverted correlation state in a received digital signal when an strong inverted direct current (DC) content is sensed in the received digital signal. This is indicative that an inverted code sequence was sent in the received digital signal. By pulse-keying the inverted correlation state, commands may be encoded to implement a simplified cordless signaling protocol.

Another aspect of the present invention is only two commands each for the base station and remote handset are necessary. For the base station, the two commands encoded are a 'Flash' and a 'On-hook/Off-hook' toggle. For the remote handset, the two command encoded are a 'Ring' and a 'Page/Find'.

Figure 1:
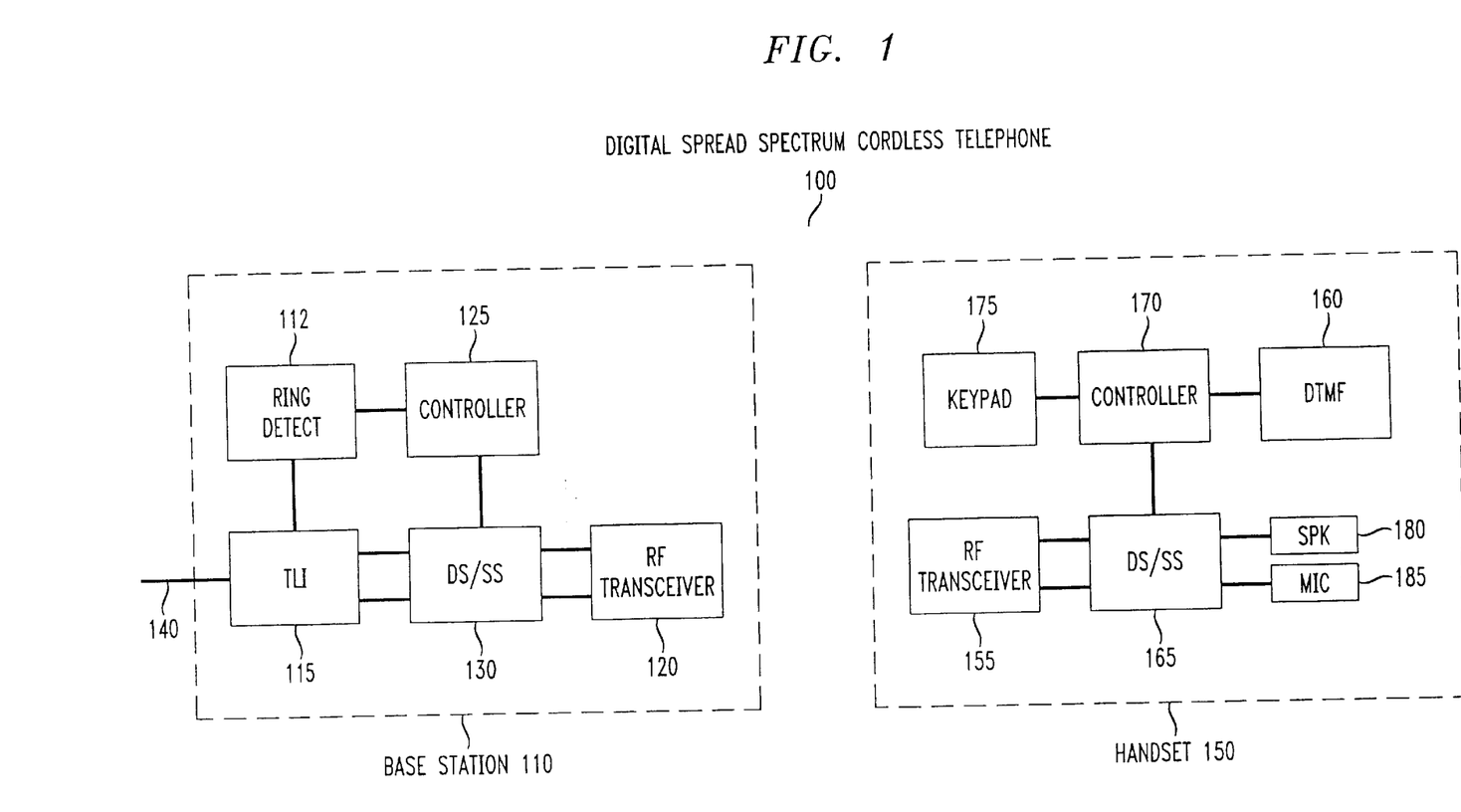
FIG. 1 is block diagram of a direct sequence spread spectrum (DS/SS) digital cordless telephone that includes an inverted code sequence cordless signaling protocol according to the principles of the present invention.

FIG. 1 is an illustration of a block diagram of a digital spread spectrum cordless telephone 100 including an inverted PN code sequence for cordless signaling protocol according to the principles of the present invention.

In particular, FIG. 1 shows a block diagram of a digital cordless telephone 100 implementing an inverted code sequence for cordless signaling protocol. The digital cordless telephone 100 includes a base station 110 and a remote handset 150.

The base station 110 includes a ring detect circuit 112, a telephone line interface 115, a radio frequency (RF) transceiver 120, a controller 125, and a direct sequence spread spectrum (DS/SS) module 130.

The ring detect circuit 112 interfaces with the telephone line interface 115 and the controller 125. The ring detect circuit 112 provides a ring detect signal to indicate to the controller 125 of an incoming telephone call.

The telephone line interface 115 in the base station 110 provides the conventional isolation, DC and AC impedance as required by telephone company standards, to a telephone line 140.

The RF transceiver 120 provides a way to convert and transmit a digital spread spectrum signal to a RF digital spread spectrum signal to the remote handset 150. The RF transceiver 120 also provides a way to receive and convert a RF digital spread spectrum signal from the handset 150 to a digital spread spectrum signal.

The controller 125 may be a digital signal processor (DSP), a microprocessor, a microcontroller, or a combinational logic. Preferably, in this embodiment of the present invention, the combinational logic is used as the controller 125 in order to reduce the cost of the overall digital cordless telephone 100. The controller 125 provides an execution platform to execute any software program to operate the digital cordless telephone 100.

The DS/SS module 130 provides a way to convert between analog voice signals and spread spectrum digital voice signals.

The remote handset 150 of the digital cordless telephone 100 includes complementary RF transceiver 155, a DS/SS module 165, and controller 170. The remote handset 150 also includes a dual tone multiple frequencies (DTMF) generator 160, a keypad 175, a speaker 180, and a microphone 185.

The DTMF generator 160 provides touch-tone signals to dial out on the telephone line 140 by the digital cordless telephone 100.

The keypad 175 allows a user to input commands to the controller 170 of the remote handset 150.

The speaker 180 provides a way for the user to hear the output voice signals from the remote handset 150.

The microphone 185 provides a way for the user to input voice signals into the remote handset 150.

In the transmit direction, the microphone 185 outputs an analog signal to the DS/SS module 165, which converts the microphone input signal to a digital spread spectrum signal. The digital spread spectrum signal is input to the RF transceiver 155 for transmission to the base station 110.

The base station 110 receives the transmitted digital spread spectrum signal through the RF transceiver 120. The DS/SS module 130 decodes the digital spread spectrum signal into an analog voice signal. The analog voice signal is then passed to the TLI 115 to send to a destination via the telephone line 140.

In the receive direction, an incoming analog voice signal is received at the TLI 115 through the telephone line 140. The TLI 115 passes the analog voice signal to the DS/SS module 130 for conversion into a digital spread spectrum signal. The digital spread spectrum signal is then passed to the RF transceiver 120 for transmission to the remote handset 150 as a RF digital spread spectrum signal.

The RF transceiver 155 of the remote handset 150 receives the transmitted RF digital spread spectrum signal. The RF transceiver 155 converts the received signal from RF to a digital spread spectrum signal. The DS/SS module 165 converts the digital spread spectrum signal to an analog voice signal to be outputted through the speaker 180.

Figure 2:
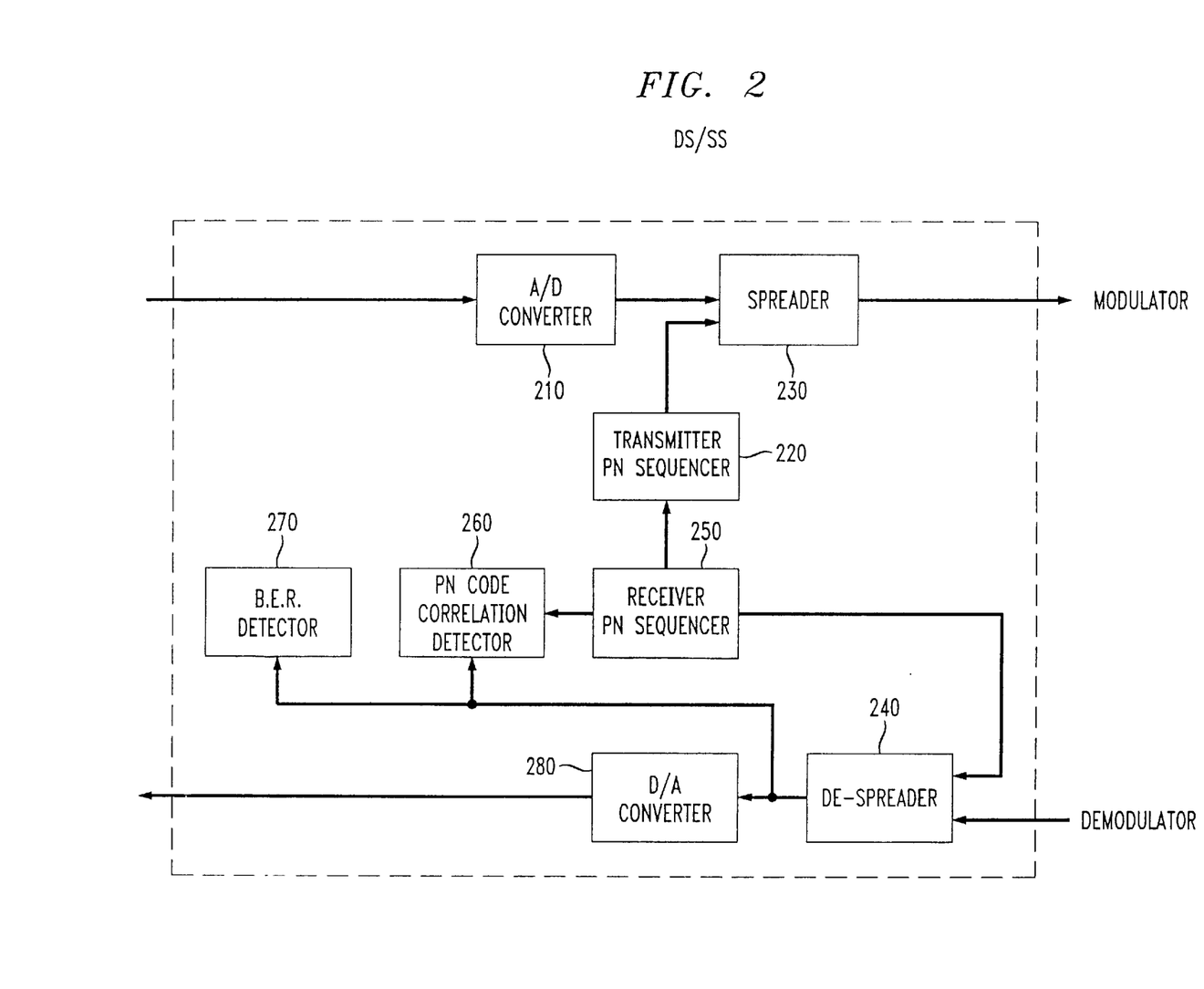
FIG. 2 is a more detailed block diagram of the DS/SS module included in the DS/SS digital cordless telephone of FIG. 1.

The base station 110 and the remote handset 150 each include a complementary DS/SS module, 130 and 165. FIG. 2 illustrates a simplified block diagram of the DS/SS module.

The DS/SS module 200 includes, in the transmit direction, an analog-to-digital (A/D) converter 210, a transmitter pseudo-noise (PN) sequencer 220, and a spreader 230. In the receive direction, the DS/SS module 200 includes a despreader 240, a receiver PN sequencer 250, a PN code correlation detector 260, a bit error rate (BER) detector 270, and a digital-to-analog (D/A) converter 280.

In the transmit direction, an analog voice signal is converted to a digital signal by the A/D converter 210. The digital signal is then 'spread' at the spreader 230 by exclusive NOR'ing ("XNOR'ing") the output of the A/D converter 210 with the serial output of the transmitter PN sequencer 220.

If the output of the A/D converter 210 is held logic high, the signal from the transmitter PN sequencer 220 passes directly through the spreader 230 and serves as a 'barker' code.

If the output of the A/D converter 210 is held logic low, the PN code from the transmitter PN sequencer 220 is inverted by the spreader 230, and a complementary inverted code sequence is transmitted, i.e., an inverted 'barker' code. The inverted code sequence is a special state used for sending signaling data.

After a received digital spread signal is demodulated, the received spread spectrum digital signal is 'de-spread'. The despreader 240 exclusive NORs ("XNORs") the received spread digital signal with the serial output of the receiver PN sequencer 250. The output of the despreader 240 is a digital signal.

The PN code correlation detector 260 monitors the output of the despreader 240. The PN code correlation detector provides a way to detect whether the incoming digital signal contains the PN code sequence.

If the incoming digital signal contains the PN code sequence, the PN code correlation detector 260 senses a correlation state by detecting a strong direct current (DC) content in the incoming digital signal. The strong DC content is indicative of PN code synchronization. The PN code correlation detector 260 also detects an inverse correlation state by sensing an inverted strong DC content signal in the incoming digital signal. The inverse correlation state is indicative that an inverted code sequence has been transmitted.

Bit errors in the RF link between the base station 110 and the remote handset 150 do no affect the PN code correlation detector 260. The PN code correlation detector 260 integrates the bit errors out as high frequency pseudo-noise.

The BER detector 270 also monitors the output of the despreader 240. The BER detector 270 provides a way to detect for error on the RF link between the base station 110 and the remote handset 150.

The output of the despreader 240 drives the D/A converter 280, which converts the digital signal to analog signal for output.

Figure 3A:
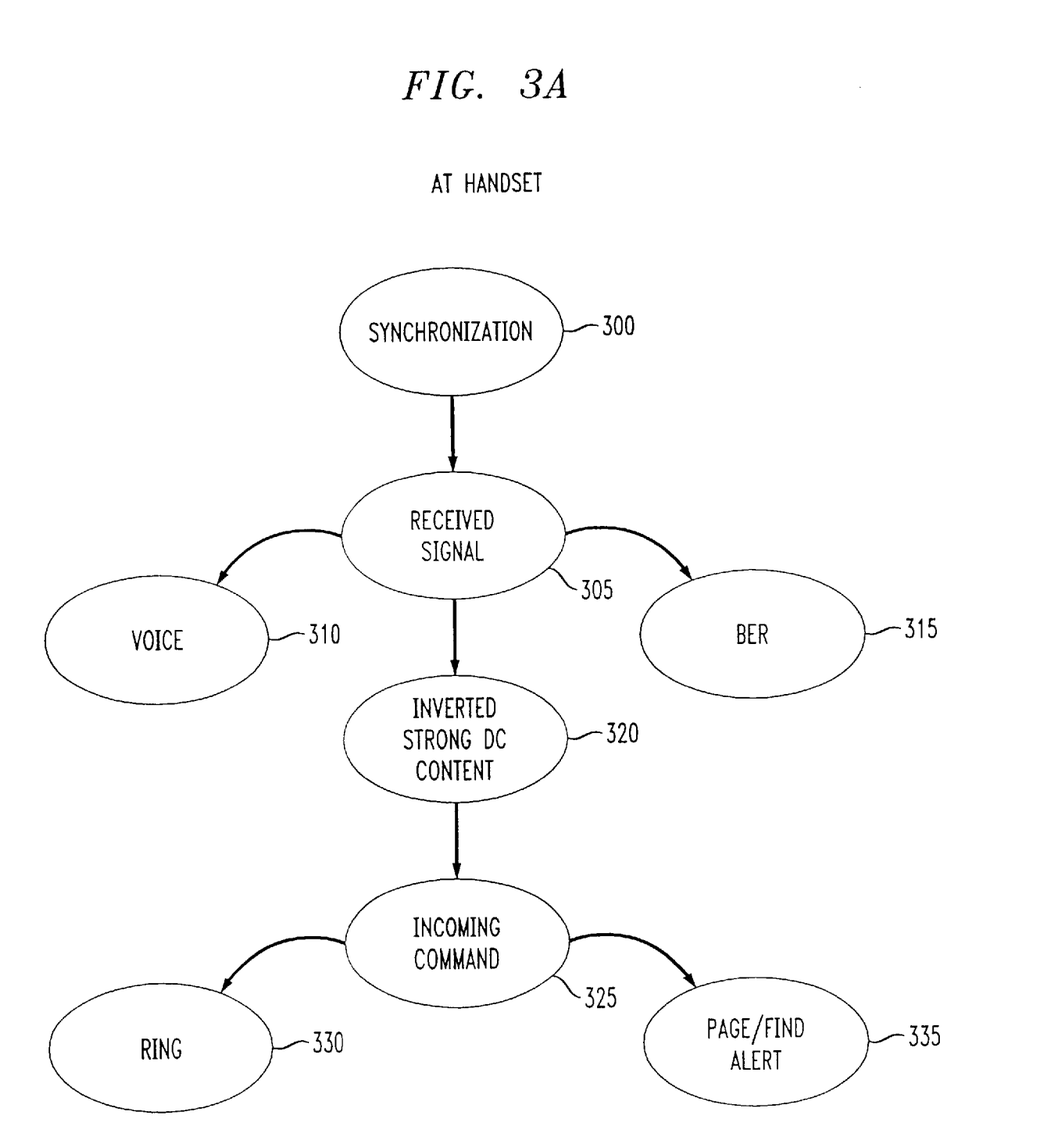
FIG. 3A shows an illustration of a software state machine showing the functions in a base station of FIG. 1 affected by an inverted code sequence cordless signaling protocol.

The digital cordless phone 100 includes an inverted PN code sequence for cordless signaling. FIG. 3A illustrates a receive flow diagram the inverted PN code sequence for cordless signaling for the handset 150 of the digital cordless phone 100.

As shown in FIG. 3A, the base station 110 initiates synchronization by outputting its PN code sequence as a 'barker' signal. The PN correlation detector 260 of the remote handset 150 detects a correlation state by sensing a strong DC content in the barker signal. The remote handset 150 is synchronized with the base station 110, in step 300.

In step 305, the remote handset 150 receives another signal from the base station 110 that is processed by the DS/SS module 165 of the remote handset 150.

If the PN correlation detector 260 of the remote handset 150 detects a loss of PN code correlation in the received signal, this is an indication that valid voice data is being received from the base station 110, in step 310

If the PN correlation detector 260 of the remote handset 150 detects a high bit error in the received signal between the remote handset 150 and base station 110, this is an indication that the RF link is lost, in step 315.

If the PN correlation detector 260 of the remote handset 150 detects a strong inverted DC content in the received signal, this is an indication to the remote handset 150 that the base station 110 is attempting to signal a command to the remote handset 150, in step 320.

In step 325, the remote handset 150 processes the received signal to detect an incoming command. In the present embodiment of the invention, the handset 150 and base station 100 use a 'Morse' type modulation to indicate the incoming command. The 'Morse' type modulation uses an 'ON-OFF" keying of the inverted PN Code sequence for command encoding. Using this method, a 'Ring" and a "Page/Find Alert' requires the encoding of two commands. Of course, other types of modulation techniques may be used for the encoding of commands such as pulse width modulation.

From step 335, if the received signal is a 'Ring' command, the controller 170 of the handset 150 will ring the handset 150 in step 330.

If the decoded command from step 325 is a 'Page/Find'; the controller 170 activates a tone to indicate the location of the handset 150 in step 335.

Figure 3B:
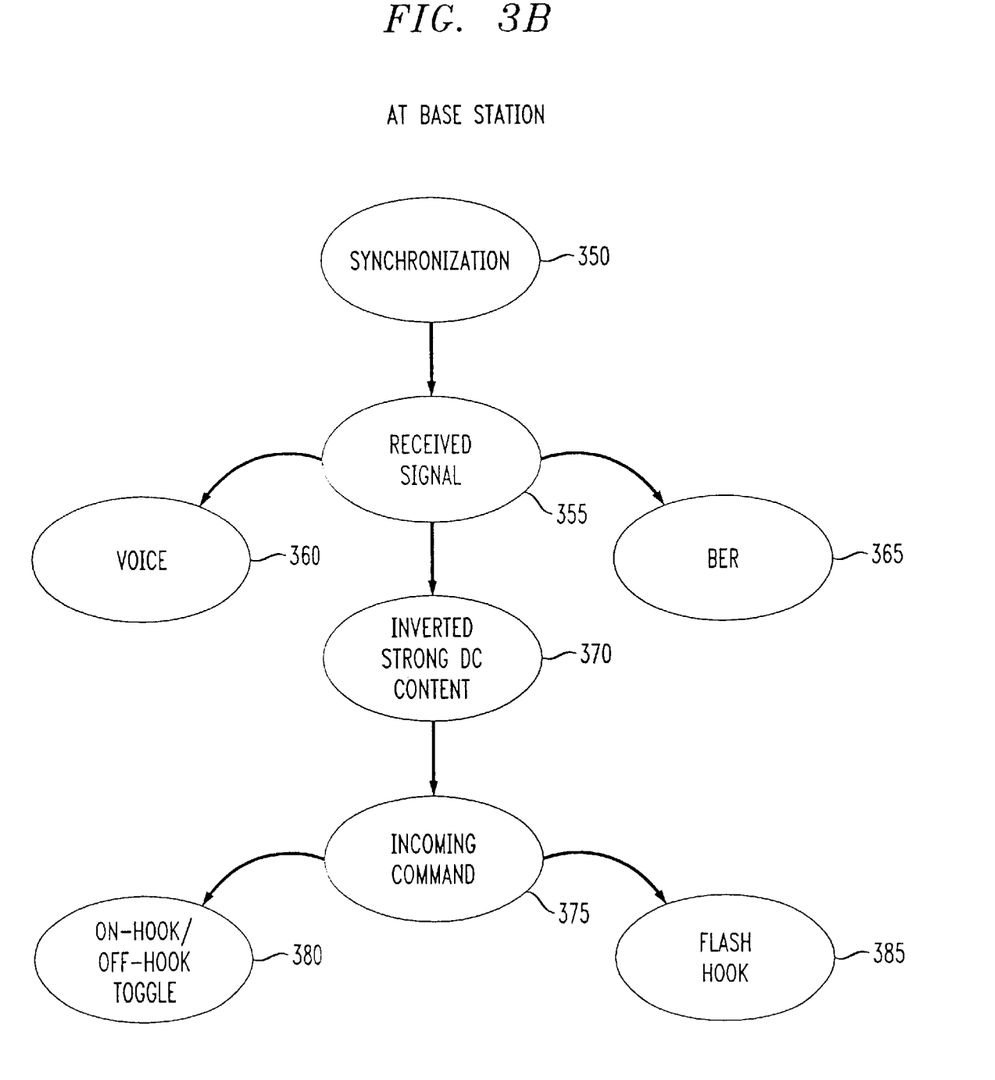
FIG. 3B shows an illustration of a software state machine showing the functions in a remote handset of FIG. 1 affected by an inverted code sequence cordless signaling protocol.

FIG. 3B illustrates a receive flow diagram the inverted PN code sequence for cordless signaling for the base station 110 of the digital cordless phone 100.

As shown in FIG. 3B, the remote handset 150 initiates synchronization by outputting its PN code sequence as a 'barker' signal. The PN correlation detector 260 of the base station 110 detects a strong DC content in the barker signal, the base station 110 synchronizes with the remote handset 150, in step 350.

In step 355, the base station 110 receives another signal from the remote handset 150 that is processed by the DS/SS module 165 of the base station 110.

If the PN correlation detector 260 of the base station 110 detects a loss of PN code correlation in the received signal, this is an indication that valid voice data is being received from the remote handset 150 as long as there is not an unacceptable high level of bit errors, in step 360.

If the PN correlation detector 260 of the base station 110 detects a high bit error in the received signal between the remote handset 150 and base station 110, this is an indication that the RF link is lost, in step 365.

If the PN correlation detector 260 of the base station 110 detects an inverse correlation state by sensing a strong inverted DC content in the received signal, this is an indication to the base station 110 that the remote handset 150 is attempting to signal a command to the base station 110, in step 370.

In step 375, the base station 110 processes the received signal to detect an incoming command. In the present embodiment of the invention, the remote handset 150 and base station 110 use a 'Morse' type modulation to indicate the incoming command. The 'Morse' type modulation uses an 'ON-OFF" keying of the inverted PN Code sequence for command encoding. Using this method, two commands, a 'On-hook/Off-hook' toggle and a 'Flash', require encoding.

From step 375, if the decoded command is a 'On-hook/Off-hook' toggle command, the controller 125 of the base station 110 toggles the hook switch (not shown) position. If the hook switch is currently in the 'Off-hook' position, the controller 125 toggles the hook switch to be in the 'On-hook' position. If the hook switch is currently in the 'On-hook' position, the controller 125 toggles the hook switch to be in the 'Off-hook' position, in step 380.

If the decoded command from step 375 is a 'Flash' hook command, the controller 125 the hook switch is quickly toggled to the 'On-hook' position and back to the 'Off-hook' position, in step 385.

Figure 4A:
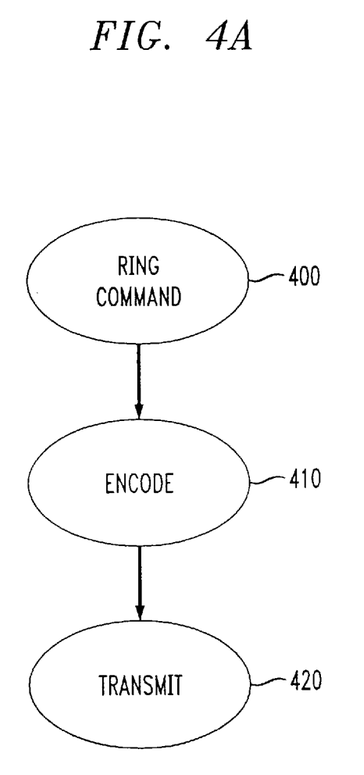
FIG. 4A shows a flow diagram of the base station of FIG. 1 implementing a 'Ring' command using an inverted code sequence cordless signaling protocol.

FIG. 4A illustrates a flow diagram for a 'Ring' command using an inverted PN code sequence for cordless signaling implemented by a base station in FIG. 1.

When a base station 110 detects an incoming call from the telephone line 140 through the TLI interface 115 with the ring detect circuit 120, the controller 125 initiates a 'Ring' signal to the handset 150, in step 400.

In step 410, the encoded sequence that represents the 'Ring' command is encoded by controlling the length of time the output of A/D converter 210 is held low for the base station 100. Although pulse key modulation is disclosed in the present embodiment, other modulation techniques may be applicable.

In step 420, the 'Ring' command is transmitted by the RF transceiver 120 to the remote handset 150.

Figure 4B:
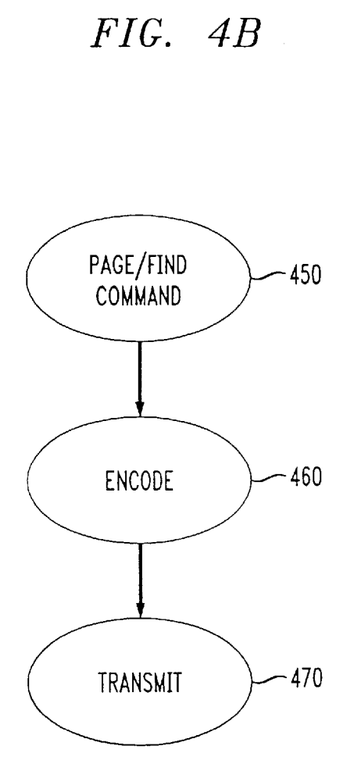
FIG. 4B shows a flow diagram of the base station of FIG. 1 implementing a 'Page/Find' command using an inverted code sequence cordless signaling protocol.

FIG. 4B illustrates a flow diagram for a 'Page/Find' command using an inverted code sequence in the base station 110 of the digital cordless telephone 100 of FIG. 1.

When a user needs to locate the handset 150, the user will activate a page/find key (not shown) on the base station 100. The controller 125 of the base station 100 signals a 'Page/Find' command to the remote handset 150 by using an inverted code sequence in step 450.

In step 450, the encoded sequence that represents the 'Page/Find' command is encoded by controlling the length of time the output of A/D converter 210 is held low for the base station 110. Although pulse key modulation is disclosed in the present embodiment, other modulation techniques may be applicable.

In step 470, the 'Page/Find' command is transmitted by the RF transceiver 120 to the remote handset 150.

Figure 5A:
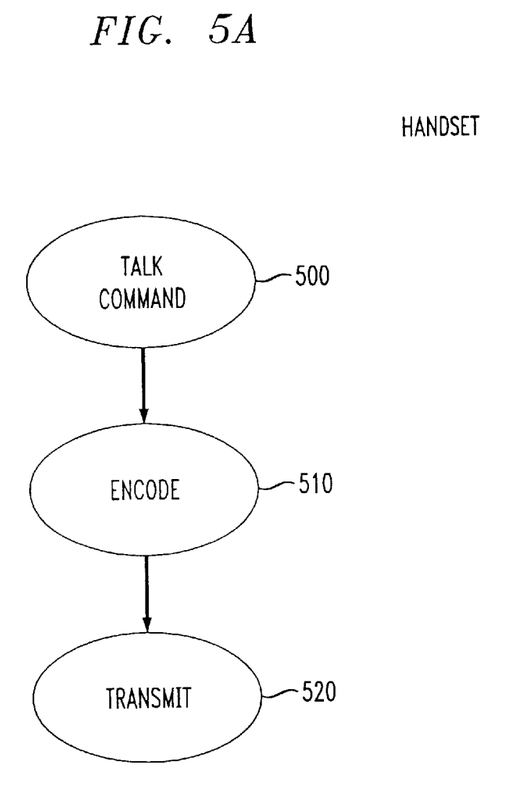
FIG. 5A shows a flow diagram of the remote handset of FIG. 1 implementing a 'Talk' command using an inverted code sequence cordless signaling protocol.

FIG. 5A illustrates a flow diagram for a 'Talk' command using an inverted code sequence in the handset 150 of the digital cordless telephone 100 of FIG. 1.

When a user needs to begin a telephone call, the user typically activates the 'Talk' button (not shown) located on the handset 150. The activation of the 'Talk' button is an indication to the base station 110 to place the hook switch (not shown) in an 'Off-hook' position so a telephone call may begin. The subsequent activation of the 'Talk' button will also indicate to the base station 110 to place the hook switch in an 'On-hook' position so the telephone call may end.

When the user activates the 'Talk' button, the controller 170 of the handset 150 initiates a 'Talk' command to the base station 110 by using an inverted PN code sequence, in step 500.

In step 510, the encoded sequence that represents the 'Talk' command is encoded by controlling the length of time the output of A/D converter 210 is held low by the controller 170 of the remote handset 150. Although pulse key modulation is disclosed in the present embodiment, other modulation techniques may be applicable.

In step 520, the 'Talk' command is transmitted by the RF transceiver 120 to the base station 110.

Figure 5B:
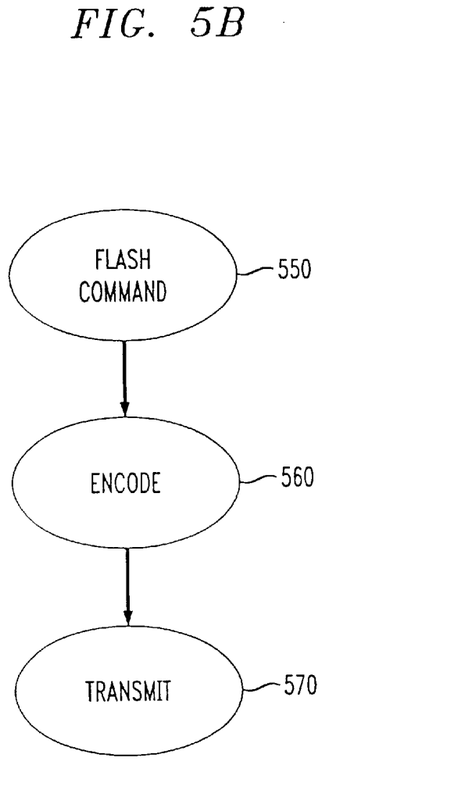
FIG. 5B shows a flow diagram of the remote handset of FIG. 1 implementing a 'Flash' command using an inverted code sequence cordless signaling protocol.

FIG. 5B shows a flow diagram of the handset 150 of FIG. 1 implementing a 'Flash' command transmission using an inverted code sequence cordless signaling protocol.

The typical user may have a 'call waiting' feature that allows the user to be notified of an incoming call while the user is currently engaged in a telephone call. The user typically activates the 'Flash' function (not shown) on the handset 150 to place the telephone call on hold and answer the incoming call.

When the user activates the 'Flash' button, the controller 170 of the handset 150 initiates a 'Flash' command to the base station 110 by using an inverted PN code sequence, in step 550.

In step 560, the encoded sequence that represents the 'Flash' command is encoded by controlling the length of time the output of A/D converter 210 is held low for the remote handset 150. Although pulse key modulation is disclosed in the present embodiment, other modulation techniques may be applicable.

In step 570, the 'Flash' command is transmitted by the RF transceiver 155 to the base station 110.

While the invention has been described with reference to the exemplary embodiments thereof, those skilled in the art will be able to make various modifications to the described embodiments of the invention without departing from the true spirit and scope of the invention.

What is claimed is:

1. A method for cordless signaling in a digital cordless telephone, said method comprising:

transmitting an inverted code sequence signal from a transmitter of said digital cordless telephone;

inducing a signaling state from said signal in a receiver of said digital cordless telephone, said signaling state including an inverse correlation state; and decoding a command from said signal.

2. The method for cordless signaling in a digital cordless telephone of claim 1, further comprising:

pulsing an inverted code sequence to generate said signal.

3. The method for cordless signaling in a digital cordless telephone of claim 1, wherein:

said receiver includes a base station and said transmitter includes a remote handset.

4. The method for cordless signaling in a digital cordless telephone of claim 1, wherein:

said receiver includes a remote handset and said transmitter includes a base station.

5. A system for cordless signaling in a digital cordless telephone, said system comprising:

a transmitter;

a receiver;

a receiving detector; and a receiving controller wherein said receiving controller, upon receiving an inverted code sequence signal transmitted from said transmitter, decoding a command from a signaling state induced by said signal in said receiving detector located in said receiver, said signaling state including an inverse correlation state.

6. The system for cordless signaling in a digital cordless telephone of claim 5, wherein:

said transmitter pulses an inverted code sequence to encode said signal.

7. The system for cordless signaling in a digital cordless telephone of claim 5, wherein:

said transmitter includes a remote handset and said receiver includes a base station.

8. The system for cordless signaling in a digital cordless telephone of claim 5, wherein:

said transmitter includes a base station and said receiver includes a remote handset.

9. A system for cordless signaling in a digital cordless telephone, said system comprising:

a transmitter;

a receiver;

a receiving detector;

a receiving controller wherein said receiving controller, upon receiving an inverted code sequence signal transmitted from said transmitter, decodes a command from a signaling state induced by said signal in said receiving detector located in said receiver;

a transmitter analog-to-digital (A/D) converter;

a transmitter code sequencer; and a spreader wherein said spreader generates an inverted code sequence by combining an output of said transmitter A/D converter held logic low and a serial output of said transmitter code sequencer.

10. A system for cordless signaling in a digital cordless telephone, comprising:

a transmitter;

a receiver;

a receiving detector; and a receiving controller wherein said receiving controller, upon receiving an inverted code sequence signal transmitted from said transmitter, decodes a command from a signaling state induced by said signal in said receiving detector located in said receiver;

wherein said receiver detector generates said signaling state by detection of a strong inverted direct current (DC) content in said command.

11. The system for cordless signaling in a digital cordless telephone of claim 10, wherein:

said strong inverted DC content is generated by an inverted code sequence in said signal.

12. A receiver for cordless signaling from a transmitter in a digital cordless telephone, said receiver comprising:

a code detector;

a receiving radio frequency (RF) transceiver; and a receiving controller wherein said receiving controller, upon receiving an inverted code sequence signal from said RF transceiver, decoding a command from said transmitter if said code detector detects a signaling state from said signal, said signaling state including an inverse correlation state.

13. The receiver for cordless signaling from a transmitter in a digital cordless telephone of claim 12, wherein:

said receiver includes a remote handset.

14. The receiver for cordless signaling from a transmitter in a digital cordless telephone of claim 12, wherein:

said receiver includes a base station.

15. A transmitter for cordless signaling to a receiver in a digital cordless telephone, said transmitter comprising:

a transmitting signal converter;

a spreader; and a transmitting controller wherein said transmitting controller generates a command by pulsing an inverted code sequence at an output of said transmitting signal converter to an input of said spreader wherein said output of said transmitting signal converter is logically low during said pulsing.

16. The transmitter for cordless signaling to a receiver in a digital cordless telephone of claim 13, further comprising:

a radio-frequency (RF) transmitting an output of said spreader.

17. The transmitter for cordless signaling to a receiver in a digital cordless telephone of claim 13, further comprising:

a code sequencer, wherein a serial output of said code sequencer is input to said spreader.

18. The transmitter for cordless signaling to a receiver in a digital cordless telephone of claim 13, wherein:

said transmitter includes a remote handset.

19. The transmitter for cordless signaling to a receiver in a digital cordless telephone of claim 13, wherein:

said transmitter includes a base station.

* * * * *